United States Patent [19]

Piejko et al.

[11] Patent Number: 5,237,001
[45] Date of Patent: Aug. 17, 1993

[54] THERMOPLASTIC COMPOSITIONS OF POLYURETHANES AND PARTLY CROSSLINKED ALKYL ACRYLATE COPOLYMERS

[75] Inventors: Karl-Erwin Piejko, Bergisch Gladbach; Ernst Orthmann, Dormagen; Christian Lindner; Hans-Eberhard Braese, both of Cologne, all of Fed. Rep. of Germany

[73] Assignee: Bayer Aktiengesellschaft, Leverkusen, Fed. Rep. of Germany

[21] Appl. No.: 713,663

[22] Filed: Jun. 11, 1991

[30] Foreign Application Priority Data

Sep. 21, 1990 [DE] Fed. Rep. of Germany ....... 4019799

[51] Int. Cl.$^5$ ............................................. C08L 75/04
[52] U.S. Cl. ...................................... 525/66; 525/281; 525/308
[58] Field of Search ........................... 525/66, 281, 308

[56] References Cited

U.S. PATENT DOCUMENTS

| | | | |
|---|---|---|---|
| 4,179,479 | 12/1979 | Carter, Jr. | 525/66 |
| 4,317,890 | 3/1982 | Goyert et al. | 525/66 |
| 4,429,076 | 1/1984 | Saito et al. | 525/66 |
| 4,500,671 | 2/1985 | Goyert et al. | 524/494 |
| 4,518,515 | 5/1985 | Ott et al. | 525/83 |
| 4,518,743 | 5/1985 | Lindner et al. | 525/83 |
| 4,628,072 | 12/1986 | Shiraki et al. | 525/66 |
| 4,694,042 | 9/1987 | McKee et al. | 525/66 |
| 4,902,745 | 2/1990 | Piejko et al. | 525/80 |
| 5,047,473 | 9/1991 | Piejko et al. | 525/71 |
| 5,075,380 | 12/1991 | Lindner et al. | 525/183 |

FOREIGN PATENT DOCUMENTS

| | | |
|---|---|---|
| 320946 | 6/1989 | European Pat. Off. . |
| 337187 | 10/1989 | European Pat. Off. . |
| 384233 | 8/1990 | Fed. Rep. of Germany . |
| 2021600 | 12/1979 | United Kingdom . |

*Primary Examiner*—James J. Seidleck
*Assistant Examiner*—Thomas Hamilton, III
*Attorney, Agent, or Firm*—Joseph C. Gil; N. Denise Brown

[57] ABSTRACT

The present invention is directed to a thermoplastic composition which is a blend of A) a thermoplastic polyurethane and B) an at least partly crosslinked alkyl acrylate copolymer of a $C_{1-6}$ alkyl acrylate and a monomer selected from the group consisting of acrylonitrile, styrene, vinyl acetate, $C_{1-6}$ alkyl methacrylates and mixtures thereof. The preferred compositions also contain copolymer selected from the group consisting of C1) a thermoplastic graft product of a rubber component having a glass transition temperature below 0° C., which serves as the graft base, and at least one graft monomer selected from the group consisting of styrene, α-methyl styrene, acrylonitrile an $C_{1-6}$ alkyl methacrylate, C2) a rubber-free resin copolymer of styrene or α-methyl styrene with acrylonitrile, C3) mixtures thereof.

5 Claims, No Drawings

THERMOPLASTIC COMPOSITIONS OF POLYURETHANES AND PARTLY CROSSLINKED ALKYL ACRYLATE COPOLYMERS

BACKGROUND OF THE INVENTION

The present invention relates to thermoplastic compositions of polyurethanes and alkyl acrylate copolymers.

The compositions according to the invention are suitable for the production of films, seals, coatings, injection-molded and extruded articles. The compositions may also be processed by calendering or thermoforming, so that it is possible, for example, to produce laminated plastic films of comfortable appearance and feel. Films such as these are of considerable significance for the interior trim of motor vehicles, in the decorative field, in the furniture industry, in the building industry or as artificial leather. Typically, materials of the type in question often contained polyvinyl chloride ("PVC") in admixture with other polymers or plasticizers and, thus, generally contained halogen. In addition, they often contained volatile components with a tendency to migrate (such as, e.g., plasticizers, stabilizers, and processing aids). For ecological reasons (such as reusability, waste disposal, reduction of pollutant emission in the event of fire) there has recently been a demand for halogen-free substitutes. In addition, the migratable components of the known materials lead to unsatisfactory ageing behavior under the effect of heat. For these reasons, there is a demand for new plastics capable of replacing PVC-containing molding compounds.

Various polymer blends with polyurethanes are already known. British Patent 2,021,600 describes blends of thermoplastic polyurethanes and ABS. The disadvantage of these blends lies in their poor resistance to ageing and hydrolysis. These molding compositions are not suitable for the production of soft, flexible films.

European Patent 12,416 (believed to correspond to U.S. Pat. No. 4,317,890) describes thermoplastic compositions of polyurethanes and rubber graft copolymers. Typical of the rubber copolymers described are acrylate rubber and graft monomers, such as styrene, o-methyl styrene and acrylonitrile. The disadvantage of these graft copolymers is that they adversely affect surface quality when used in relatively large quantities, so that it is not possible to produce soft, flexible films.

Thermoplastic blends of thermoplastic polyurethane, fibrous reinforcing materials and a polar polymer are known from European patent 12,417 (believed to correspond to U.S. Pat. No. 4,500,671). The polar polymer contains polar and apolar monomer units, such as alkyl acrylates, alkyl methacrylates, acrylonitrile, styrene and o-methyl styrene, and butadiene/isoprene and/or acrylate units. The polar polymer may be present as a homopolymer, copolymer or graft copolymer. Crosslinked polar polymers are not preferred. The disadvantage of such compositions is that the polar polymers lead to molded products which are affected by ageing and hydrolysis and which, in addition, have surfaces of poor quality and an unpleasant, rubber-like feel where the polar polymers are used in relatively large quantities.

The problem addressed by the present invention was to provide thermoplastic compositions having improved surfaces, improved processibility by calendering and thermoforming and an attractive range of properties for leather substitutes, including an aesthetic feel and grain stability.

DESCRIPTION OF THE INVENTION

The present invention is directed to a thermoplastic composition comprising A) a thermoplastic polyurethane and B) an at least partly crosslinked alkyl acrylate copolymer of B1) a $C_{1-6}$ alkyl acrylate and B2) a monomer selected from the group consisting of acrylonitrile, styrene, vinyl acetate, a $C_{1-6}$ alkyl methacrylate, and mixtures thereof.

Blends of various thermoplastic polyurethanes various alkyl acrylate copolymers and mixtures of various components B1) and B2) may of course be used.

In one preferred embodiment, the thermoplastic compositions according to the invention comprise from 10 to 90 parts by weight A), preferably from 50 to 90 parts by weight A), and from 10 to 90 parts by weight B) and preferably from 10 to 50 parts by weight B), with the total amount of A) and B) totalling 100 parts. Component B) is preferably crosslinked with crosslinking vinyl or allyl monomers.

The gel content of copolymer B) is preferably at least 60% by weight and, more preferably, at least 70% by weight, as determined in accordance with M. Hoffmann et al., Polymeranalytik I+II, Georg Thieme verlag, Stuttgart (1977)

The average particle size of copolymer B) is preferably from 0.07 to 0.5 $\mu$m (d50 value).

In one preferred embodiment, the thermoplastic compositions according to the invention additionally contain at least one other polymer C) selected from the group consisting of C1) thermoplastic graft products of preferably 30 to 80% by weight of a rubber component having a glass transition temperature below 0° C., which serves as the rubber component, and 70 to 20% by weight of at least one graft monomer selected from the group consisting of styrene, o-methyl styrene, acrylonitrile and $C_{1-6}$ alkyl methacrylates, C2) a rubber-free resin copolymer based on styrene or $\alpha$-methyl styrene and acrylonitrile, and C3) mixtures thereof.

Component C) is preferably added in quantities of from 5 to 200% by weight and more preferably in quantities of from 10 to 100% by weight, based on the sum of components A) and B). Particularly preferred molding compositions contain as component C) a mixture of graft product C1) and a thermoplastic C2) selected from the group of styrene or o-methyl styrene copolymers. In these molding compounds containing C1) and C2), A) is present in a quantity of, in particular, 10 to 50% by weight, based on the sum of A)+B)+C).

The thermoplastic polyurethanes (component A)) are generally known and are produced by known methods. They are generally produced from long-chain polyols having molecular weights of from 400 to 10,000, diisocyanates and chain-extending agents (preferably short-chain polyols) having molecular weights of up to 400. The NCO:OH equivalent ratio is generally from 0.95:1 to 1.10:1.

Suitable substantially linear polyols having molecular weights of from 400 to 10,000 and preferably from 800 to 6000 include substantially any polyol generally known and preferably containing 2, or, in small quantities, even 3 Zerewitinoff-active groups (essentially hydroxyl groups). These polyols include polyesters, polylactones, polyethers, polythioethers, polyester amides, polycarbonates, polyacetals, vinyl polymers, for example polybutadiene diols, polyhydroxyl compounds already containing urethane or urea groups, optionally modified natural polyols and other compounds containing Zerewitinoff-active groups, such as amino, carboxyl or thiol groups. These types of compounds are known and are described in detail, for example, in German Offenlegungsschriften 2,302,564, 2,423,764, 2,549,372 (believed to correspond to U.S. Pat. No. 3,963,679) and 2,402,840 (believed to correspond to U.S. Pat. No. 3,984,607) and in German Auslegeschrift 2,457,387 (believed to correspond to U.S. Pat. No. 4,035,213). Preferred compounds of the type in question are hydroxyl polyesters of glycols and adipic acid, phthalic and/or terephthalic acid and hydrogenation products thereof, hydroxyl polycarbonates, polycaprolactones, polyethylene oxide, polypropylene oxide, polytetrahydrofuran and mixed polyethers of ethylene oxide and propylene oxide.

Suitable diisocyanates are the aliphatic, cycloaliphatic, aromatic, araliphatic and heterocyclic diisocyanates generally known and which are described, for example, in the above-cited German Patent publications 2,302,564, 2,423,764, 2,549,372, 2,402,840 and 2,457,387. Preferred diisocyanates are optionally methyl-substituted hexamethylene diisocyanate, isophorone diisocyanate and 4,4'-diisocyanatodiphenyl methane.

The diisocyanates mentioned may optionally be used together with up to approximately 15 mol-% (based on diisocyanate) of a higher polyisocyanate. However, the quantity in which the higher polyisocyanate is used must be limited so that the product obtained is still fusible or thermoplastic. A relatively large quantity of higher isocyanates must generally be counterbalanced by the presence of, on average, less than difunctional hydroxyl or amino compounds (or even monoisocyanates) so that excessive chemical crosslinking of the product is avoided. However, it is of course also possible to carry out the reaction in such a way that the elastomer undergoes subsequent chemical crosslinking during storage (for example through the use of an excess of NCO compounds). Examples of higher isocyanates and monofunctional compounds can also be found in the prior art cited above. Examples include monoamines, such as butyl and dibutyl amine, octyl amine, stearyl amine, N-methyl stearyl amine, pyrrolidine, piperidine and cyclohexyl amine, and also monoalcohols, such as butanol, 1-ethyl hexanol, octanol, dodecanol, amyl alcohols, cyclohexanol and ethylene glycol monoethyl ether.

The chain-extending agents to be used in accordance with the invention are also generally known and are described, for example, in German Patent publications 2,302,564, 2,423,764, 2,549,372, 2,402,799, 2,402,840 and 2,457,387. These chain-extending agents include low molecular weight polyalcohols (preferably glycols), polyamines, hydrazines and hydrazides. Aminoalcohols, such as ethanolamine, diethanolamine, N-methyl diethanolamine, triethanolamine and 3-aminopropanol, may also be used in accordance with the invention. Preferred chain-extending agents are ethylene glycol, di- and triethylene glycol, propane-1,2-diol, butane-1,3- and -1,4-diol, hexane-1,6-diol, 2-ethylhexane-1,3-diol, 2,2-dimethylpropane diol, 1,4-bis-hydroxymethyl cyclohexane and hydroquinone dihydroxyethyl ether. Hydroquinone di-$\beta$-hydroxyethyl ether, butane-1,4-diol and hexane-1,6-diol are particularly preferred.

The polymer component B) is a copolymer of BI) a $C_{1-6}$ alkyl acrylate monomer (more particularly propyl, butyl, hexyl acrylate) and B2) one or more comonomers selected from the group consisting of styrene, acrylonitrile, vinyl acetate and/or $C_{1-6}$ alkyl methacrylates. Preferred comonomers are acrylonitrile and methyl methacrylate. The monomers B1) are present in quantities of 50 to 90% by weight and more particularly 60 to 80% by weight while the monomers B2) are present in quantities of 50 to 10% by weight and, more particularly, 40 to 20% by weight. These polymers are particulate and have an average particle size of 0.07 to 0.5 $\mu$m, more particularly 0.1 to 0.3 $\mu$m, and are preferably partly crosslinked. This crosslinking is achieved by crosslinking copolymerization of the monomers BI) and B2) with crosslinking monomers B3), i.e. monomers bearing at least two allyl and/or vinyl groups in the molecule. These crosslinking monomers are preferably used in quantities of 0.1 to 5% by weight, based on the total weight of BI), B2) and B3). Typical representatives of the crosslinking monomers B3) are divinyl benzene, glycol bisacrylates, glycol bis-methacrylates, bis-acrylamides, phosphoric acid triallyl ester, citric acid triallyl ester, allyl esters of (meth)acrylic acid, triallyl cyanurate, triallyl isocyanurate; and other known crosslinking monomers.

Preferred components B0 are crosslinked, finely divided acrylate copolymer rubbers of $C_{3-6}$ alkyl acrylate as B1) (such as for example propyl, butyl, pentyl, hexyl acrylate) and at least one monomer from the group consisting of acrylonitrile, vinyl acetate, $C_{1-6}$ alkyl methacrylate, more particularly acrylonitrile and methyl methacrylate, as B2) and have particles sizes of preferably 0.07 to 0.5 $\mu$m and more preferably 0.1 to 0.3 $\mu$m.

The polymers B) are prepared by polymerization of the monomers by aqueous radical emulsion polymerization at temperatures in the range from 40° to 90° C. in the presence of typical radical initiators and polymerization aids (emulsifiers). During the polymerization reaction, the polymers accumulate in the form of emulsions (latices) having the above-mentioned average particle sizes, gel content and latex polymer concentration of 20 to 50% by weight.

In the context of the invention, the alkyl acrylate copolymers B) are understood to be copolymers which, for the most part, are not grafted.

Suitable graft products C) are obtained in known manner by polymerization of the monomers to be grafted in the presence of an elastomer component prepared in a separate polymerization step. The graft products may be produced by known polymerization processes, including emulsion, suspension and bulk polymerization and combinations of these processes. The graft products are preferably produced by emulsion polymerization.

The elastomer component serving as the graft base is a rubber-like polymer having a glass transition temperature TG of <0° C. (DIN 53 445) and, more particularly, <−30° C. Preferred elastomer components are 1,3-diene and acrylate rubbers. Butadiene and/or isoprene polymers containing up to 30% by weight styrene and/or acrylonitrile, homopolymers and copolymers of butadiene and the above-mentioned alkyl acrylates an $C_{2-6}$ alkyl acrylate rubbers being particularly preferred.

If the graft products are produced by emulsion polymerization, the particle size of the graft base (i.e. the particle diamet $d_{50}$ which is the average diameter below which 50% of the particles and above which 50% of the particles lie) should preferably be between 0.05 and 0.8 µm. The graft base is crosslinked. Products having a gel content of >50% are preferred.

Suitable monomers to be grafted are styrene, α-methyl styrene, acrylonitrile and $C_{1-6}$ alkyl methacrylate. Acrylonitrile-containing monomer combinations are preferred.

The ratio by weight of graft base to graft monomers is generally between 30:70 and 80:20, ratios by weight between 0:50 and 75:25 being preferred. It is also possible to use mixtures of several graft products in which each graft product individually satisfies the stated conditions.

Graft polymers suitable for use in accordance with the invention are known, for example, from German Auslegeschriften 3,742,103 or 3,811,899.

If the graft polymers are produced by emulsion polymerization, the latices obtained are typically worked up to powders or granules by known coagulation processes or by spray drying.

In one preferred procedure, combinations of components B) and C) are used. Since both can accumulate in the form of an aqueous emulsion, it is of advantage to subject the latex mixture to coagulation and to isolate the mixture of B) and C) for example, in the form of a powder mixture. The use of powder mixtures of B) and C) thus obtained for the production of the compositions according to the invention is preferred because advantages are afforded by the dispersion behavior of components A), B) and C) in one another. Accordingly, the powder combination of B) and C) functions as a pre-compound for the polyurethane molding compound according to the invention.

The molding compositions according to the invention may be produced by different methods:

Method 1

The individual, separate products A), B) and, optionally, C) are compounded in typical compounding units, such as kneaders, screws, and extruders (dry blending), are granulated and then further processed to moldings. Accordingly, this process operates according to known polymer blend technology.

Method 2

In this variant, components B) and C) are processed to a powder blend or granular blend by working up the latex mixture in the same way as described above. The resulting blend is subsequently compounded with the polyurethane A) in the same way as in Method 1. Advantages of this method include fewer streams of products to be dosed during compounding, greater operational reliability and quality consistency of the resulting polyurethane blends.

Method 3

This method is carried out by initially forming the polyurethane in the presence of components B) and C) (wet blending). This procedure is described in German Auslegeschrift 2,854,409. The processing and performance properties of the molding compounds according to the invention can be increased by Method 3.

Although all the procedures mentioned above give high quality polymer blends, Methods 2 and 3 are preferred for the purposes of the invention, Method 3 being particularly preferred.

The invention is further illustrated but is not intended to be limited by the following examples in which all parts and percentages are by weight unless otherwise specified. Examples A) Polyurethanes used:

A1) The polyurethane is prepared by reaction of the following components in screw extruders at temperatures of 100° to 300° C. (quantities in parts by weight):

Aa) 45.47 parts 4,4'-diphenylmethane diisocyanate

Ab) 14.03 parts butane-1,4-diol

Ac) 40.1 parts of an adipic acid/butane diol polyester (OH value 65)

0.2 part stearyl amide 0.2 part 2,6-di-tert.-butyl-4-methyl phenol 0.2 part 2,2',6,6'-tetraisopropyl diphenylcarbodiimide (NCO:OH ratio=1.03).

A thermoplastic polyurethane having the following properties is obtained:

| Shore D hardness | DIN 53 505 | 80 |
| Elongation at break [%] | DIN 53 504 | 323 |
| Notched impact strength (−40C) [kJ/m2] | DIN 53 453 | 3.1 |
| Vicat temperature, meth. A/120° C. [°C.] | DIN 53 460 | 155 |

A2) The polyurethane is prepared by reaction of the following components in screw extruders at temperatures of 100° to 300° C. (quantities in parts by weight):

Aa) 19.6 parts 4,4'diphenylmethane diisocyanate

Ab) 7.2 parts hydroquinone dihydroxy ethyl ether

Ac) 72.6 parts of an adipic acid/neopentyl glycol polyester 0.2 part stearyl amide 0.2 part 2,6-di-tert.-butyl-4-methyl phenol 0.2 part 2,2',6,6'-tetraisopropyl diphenylcarbodiimide (NCO:OH ratio=1.03).

A thermoplastic having the following properties is obtained:

| Shore A hardness | DIN 53 505 | 80 |
| Tensile strength [MPas] | DIN 53 504 | 32 |
| Elongation at break [%] | DIN 53 504 | 630 |
| Elasticity | DIN 53 512 | 32 |

A3) The polyurethane is prepared by reaction of the following components in a screw extruder at temperatures of 100° to 300° C. (quantities in parts by weight):

Aa) 35.65 parts 4,4'-diphenylmethane diisocyanate

Ab) 6.75 parts butane-1,4-diol

Ac) 28.5 parts of a polypropylene oxide diol (M=2000 g/mol)

28.5 parts of a polycarbonate diol (M=2000 g/mol)

0.2 part stearyl amide 0.2 part 2,6-di-tert.-butyl-4-methyl phenol 0.2 part 2,2',6,6'-tetraisopropyl diphenyl carbodiimide (NCO:OH ratio=1.03).

A4) The polyurethane is prepared by reaction of the following components in a screw extruder at temperatures of 100° to 300° C. (quantities in parts by weight):

Aa) 32.8 parts 4,4'-diphenylmethane diisocyanate

Ab) 6.6 parts butane-1,4-diol

Ac) 60 parts of a polytetrahydrofuran diol 0.2 part stearyl amide 0.2 part 2,6-di-tert.-butyl-4-methyl phenol 0.2 part 2,2',6,6'-tetraisopropyl diphenyl carbodiimide (NCO:OH ratio=1.03).

B) Acrylate polymers used, produced in accordance with European patent 321,832

B1) Emulsion copolymer of 30% by weight acrylonitrile, 70% by weight n-butyl acrylate crosslinked by copolymerization with 0.45% by weight, based on 100 parts by weight of the total sum of acrylonitrile and butyl acrylate, of triallyl cyanurate. The polymer was produced by radical aqueous emulsion polymerization using Na salts of $C_{14-16}$ alkyl sulfonic acids as emulsifier. The polymer has a gel content of 92% by weight and an average particle size (d50) of 0.12 μm. The emulsion polymers B) are worked up by common coagulation with 10% by weight of a styrene/acrylonitrile emulsion polymer (monomer ratio 72:28).

C) Graft polymers used.

C1) Graft polymer of 15% by weight of a coarse-particle polybutadiene having an average particle diameter (d50) of 0.4 μm and a gel content (in toluene) of 89% by weight and 15% by weight of a fine-particle polybutadiene having an average particle diameter (d50) of 0.1 μm and a gel content of 90% by weight and 70% by weight graft-polymerized monomer of 66% by weight styrene and 34% by weight acrylonitrile (based on 100 parts of the graft monomer mixture) prepared by radical emulsion polymerization of a styrene/acrylonitrile mixture in the presence of the polybutadiene latices.

C2) Graft polymer of 60 parts by weight of a coarse particle acrylate rubber having an average particle diameter (d50) of 0.50 μm and a gel content (in dimethyl formamide) of 95% by weight (produced by crosslinking copolymerization of n-butyl acrylate/triallyl cyanurate in accordance with European patent 34,748) and 40 parts by weight graft-polymerized monomer of 72% by weight styrene and 28% by weight acrylonitrile by radical emulsion polymerization in the presence of the acrylate rubber latex. The graft polymer C2) is worked up by coagulation together with 20% by weight of a styrene/acrylonitrile emulsion polymer (monomer ratio 72:28).

D) Production of the molding compositions

A twin-screw extruder of the ZSK 53 V type manufactured by Werner & Pfleiderer, Stuttgart, with self-cleaning screws and approximately 20% kneading elements. The processing unit consists of 12 separately heatable housings, the length of the processing unit corresponding to approximately 20 times the screw diameter.

The residence times of the reaction melt in the extruder are generally between 0.3 and 30 minutes and preferably between 0.5 and 4 minutes. The temperatures of the screw housing are between about 60° and 300° C. (approx. 80° to 280° C.) in the feed zone; approx. 100° to 300° C. in the middle of the extruder and approx. 120° to 250° C. in the discharge zone) The melt issuing from the extruder is quenched and size-reduced by methods known per se. The thermoplastic polyurethane elastomers are produced in the parts by weight indicated in A).

Component Ac) (containing additives) is introduced from the feed vessel kept at 120° C. into the housing 1 of a twin-screw kneader by means of a gear pump. The diol mixture Ab) heated to 60° C. is also introduced into the housing 1 by a gear pump. Component Aa) is also pumped into the housing 1 at 60° C. by a gear pump. The following housing temperatures were adjusted along the screw kneader:

| Housing | 1 | 2/3 | 4/5 | 6/7 | 8/9 | 11/12 | Head |
|---|---|---|---|---|---|---|---|
| Temperature | 80° C. | 200° C. | 200° C. | 200° C. | 220° C. | 200° C. | 240° C. |

The fully reacted thermoplastic polyurethane, component A, is introduced into the housing 1 of the ZSK 53 via a vibrating chute. The polyurethane-free thermoplastics or rather mixtures thereof (component B and optionally C) are introduced into the middle of the screw via a vibrating chute. The following housing temperatures were adjusted along the extruder:

| Housing | 1 | 2/3 | 4/5 | 6/7 | 8/9 | 11/12 | Head |
|---|---|---|---|---|---|---|---|
| Temperature | 80° C. | 200° C. | 200° C. | 200° C. | 220° C. | 200° C. | 240° C. |

The melt issuing from the extruder is quenched and size-reduced by methods known per se.

The composition of the molding compositions according to the invention and the comparison molding compositions is shown in Table 1.

As can be seen from the Table, the molding compositions according to the invention have an attractive range of basic performance properties. Important advantages over a molding composition of 100 parts by weight of component A (i.e. without the components according to the invention) are: particularly good melt flow during processing, tackfree behavior on a calender, good processing to calendered films which can be processed by thermoforming. The resulting calendered films have an improved appearance and feel (for example for leather substitute films). the uncomfortable, so-called "rubber feel" is eliminated by the additives B and C. In addition, leather-like grains of high grain stability can be applied by embossing. In addition to the low softening temperature, the addition of a commercially available nitrile rubber of butadiene/acrylonitrile polymer (30% by weight acrylonitrile) to a polyurethane (Example 3, comparison) leads to light-sensitive and hydrolysis-sensitive molding compounds. If the percentage content of the nitrile rubber is increased as in Example 2 (50% by weight), the molding compound obtained has a rough surface and rubber-like feel.

Molding compositions 6 to 11 are subjected to a thermoforming test:

Thermoforming test

A film produced on rollers (length 300 mm, width 300 mm, thickness 1 mm) is placed in a thermoforming mold and heated to a surface temperature of 160° C. and 175° C. (surface temperature determined by melting salt). A frustum corresponding to FIG. 1 of German Auslegeschrift 3,811,899 is pressed to a depth of 21 cm into the film while a vacuum is applied. Hollow articles of uniform wall thickness corresponding to the frustum are obtained at a surface temperature of 175° C. and 160° C.

Examples 8 to 10 show that the addition of a polyurethane to a known molding composition suitable as a leather substitute (Comparison Example 11) improves the mechanical properties, such as flexibility, elasticity and strength. Thermoformability remains unaffected.

TABLE 1

| Example | Polyurethane Comp. A (parts by wt.) | Component B (parts by wt.) | Component C (parts by wt.) | Shore hardness DIN 53 505 | Tensile strength [MPa] DIN 53 504 | Breaking elongation [%] DIN 53 504 | Elasticity [%] DIN 53 512 | Notched impact strength at 23° C./ −40° C. [kJ/m²] DIN 53 453 | Vicat A temp. [°C.] DIN 53 460 |
|---|---|---|---|---|---|---|---|---|---|
| 1 | A1:88.5 | B1:11.5 | — | D:51 | 26 | 410 | τ | u.b./5 | 174 |
| 2 | A2:50 | B1:50 | — | A:73 | 15 | 500 | 20 | τ | τ |
| 3 (Comp.) | A1:88.5 | NBR*:11.5 | — | D:52 | 30 | 450 | τ | u.b./2 | 147 |
| 4 | A1:88.5 | B1:4.6 | C2:6.9 | D:56 | 33 | 490 | 41 | u.b./τ | τ |
| 5 | A1:88.5 | B1:4.6 | C1:6.9 | D:56 | 32 | 450 | 43 | u.b./5 | τ |
| 6 | A3:40 | B1:24 | C1:36 | D:45 | 21 | 280 | τ | τ | 83 |
| 7 | A3:40 | B1:27 | C2:33 | D:34 | 22 | 330 | τ | τ | 70 |
| 8 | A4:20 | B1:36 | C2:44 | D:39 | 19 | 270 | τ | τ | τ |
| 9 | A4:40 | B1:27 | C2:33 | D:38 | 22 | 370 | τ | τ | τ |
| 10 | A4:50 | B1:22 | C2:28 | D:36 | 24 | 420 | τ | τ | τ |
| 11 (Comp.) | — | B1:44 | C2:56 | D:40 | 18 | 210 | τ | τ | τ | u.b. = unbroken
τ = not measured
* = commercially available nitrile rubber containing 30% by weight acrylonitrile Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic composition comprising
A) a thermoplastic polyurethane and
B) an at least partly crosslinked alkyl acrylate co-polymer of
   B1) a $C_{1-6}$ alkyl acrylate,
   B2) a monomer selected from the group consisting of acrylonitrile, styrene, vinyl acetate, $C_{1-6}$ alkyl methacrylates and mixtures thereof, and
   B3) a crosslinking monomer containing at least two allyl and/or vinyl groups per molecule
wherein said alkyl acrylate co-polymer is not a grafted copolymer.

2. The thermoplastic composition of claim 1, wherein component A) comprises from 10 to 90 parts by weight per 100 parts by weight of components A) and B).

3. The thermoplastic composition of claim 2, wherein component A) comprises from 50 to 90 parts by weight per 100 parts by weight of components A) and B).

4. The thermoplastic composition of claim 1, wherein the copolymer B) has a gel content of at least 60% by weight and an average particle size of 0.07 to 0.5 μm (d50) value.

5. The thermoplastic composition of claim 1, wherein the alkyl acrylate copolymer B) has a particle size of 0.07 to 0.5 μm.

* * * * *